United States Patent
Cahn et al.

(10) Patent No.: US 8,774,315 B2
(45) Date of Patent: Jul. 8, 2014

(54) PHASE-OPTIMIZED CONSTANT ENVELOPE TRANSMISSION (POCET) METHOD, APPARATUS AND SYSTEM

(75) Inventors: Charles Robert Cahn, Manhattan Beach, CA (US); Philip A. Dafesh, Manhattan Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 1002 days.

(21) Appl. No.: 12/547,383

(22) Filed: Aug. 25, 2009

(65) Prior Publication Data

US 2011/0051783 A1 Mar. 3, 2011

(51) Int. Cl.
*H04K 1/02* (2006.01)
*H04L 25/03* (2006.01)
*H04L 25/49* (2006.01)

(52) U.S. Cl.
USPC ........... 375/297; 375/274; 375/275; 375/304; 375/305; 375/306

(58) Field of Classification Search
USPC .......... 375/295–308, 130–153, 211, 259–285
See application file for complete search history.

(56) References Cited

U.S. PATENT DOCUMENTS

| | | | |
|---|---|---|---|
| 6,335,951 B1 | 1/2002 | Cangiani et al. | |
| 6,430,213 B1 | 8/2002 | Dafesh | |
| 7,035,245 B2 | 4/2006 | Orr et al. | |
| 7,120,198 B1 | 10/2006 | Dafesh et al. | |
| 7,154,962 B2 | 12/2006 | Cangiani et al. | |
| 8,073,079 B1* | 12/2011 | Ahmed | 375/324 |
| 2006/0039498 A1* | 2/2006 | de Figueiredo et al. | 375/297 |
| 2006/0154622 A1* | 7/2006 | Piirainen | 455/115.1 |
| 2012/0269235 A1* | 10/2012 | Pratt et al. | 375/147 |

OTHER PUBLICATIONS

J.J. Spilker, Jr., R.S. Orr, "Code Multiplexing via Majority Logic for GPS Modernization," Proceedings of the Institute of Navigation (ION) GPS—98, Sep. 15-18, 1998.
P.A. Dafesh, T.M. Nguyen and S. Lazar, "Coherent Adaptive Subcarrier Modulation (CASM) for GPS Modernization," Proceedings of the Ion National Technical Meeting, Jan. 1999.
P.A. Dafesh, "Quadrature Product Subcarrier Modulation," Proceedings of the IEEE Aerospace Conference, Mar. 1999.

* cited by examiner

*Primary Examiner* — Sam K Ahn
*Assistant Examiner* — James M Perez
(74) *Attorney, Agent, or Firm* — Henricks, Slavin & Holmes LLP

(57) ABSTRACT

An apparatus and method for generating a composite signal includes electronics configured to modulate a carrier utilizing a finite set of composite signal phases to generate a composite signal, the finite set of composite signal phases being determined through an optimization process that minimizes a constant envelope for the phase modulated carrier, subject to constraints on desired signal power levels of the signals to be combined and either zero or one or more relative phase relationships between the signals. The apparatus and method can be extended to generating an optimized composite signal of different frequencies.

54 Claims, 6 Drawing Sheets

POCET System Combining 5 Signals

POCET System Combining 5 Signals

| Binary chip value of C/A | Binary chip value of P(Y) | Binary chip value of L1C$_P$ | Binary chip value of L1C$_D$ | Transmitted phase angle |
|---|---|---|---|---|
| 0 | 0 | 0 | 0 | 0° |
| 0 | 0 | 0 | 1 | 349.7° |
| 0 | 0 | 1 | 0 | 310.3° |
| 0 | 0 | 1 | 1 | 231.9° |
| 0 | 1 | 0 | 0 | 336.3° |
| 0 | 1 | 0 | 1 | 257.9° |
| 0 | 1 | 1 | 0 | 218.5° |
| 0 | 1 | 1 | 1 | 208.2° |
| 1 | 0 | 0 | 0 | 28.2° |
| 1 | 0 | 0 | 1 | 38.5° |
| 1 | 0 | 1 | 0 | 77.9° |
| 1 | 0 | 1 | 1 | 156.3° |
| 1 | 1 | 0 | 0 | 51.9° |
| 1 | 1 | 0 | 1 | 130.3° |
| 1 | 1 | 1 | 0 | 169.7° |
| 1 | 1 | 1 | 1 | 180° |

Optimized Phase Table For 4 Signals

Assignment of transmitted phase angles as function of binary chip values
2 states per symbol +1 (0), -1(1)

| s1 | S1 | S3 | Phase angle |
|----|----|----|-------------|
| 0  | 0  | 0  | $\theta_0 = 0°$ |
| 0  | 0  | 1  | $\theta_1$ |
| 0  | 1  | 0  | $\theta_2$ |
| 0  | 0  | 1  | $\theta_3$ |
| 1  | 0  | 0  | $\theta_4$ |
| 1  | 0  | 1  | $\theta_5$ |
| 1  | 1  | 0  | $\theta_6$ |
| 1  | 1  | 1  | $\theta_7$ |

Determined through Optimization Subject to constraints

Complement of above "symmetry"

$b_k$

3 Signal, BPSK Example Possible Phase States

Combining Loss as a Function of Relative Phase Between L1C and GLONASS FDMA

Spectrum of Constant-Envelope Combining of L1C and GLONASS FDMA

PHASE-OPTIMIZED CONSTANT ENVELOPE TRANSMISSION (POCET) METHOD, APPARATUS AND SYSTEM

STATEMENT OF GOVERNMENT INTEREST

The invention was made with Government support under contract No. FA8802-04-C-0001 by the Department of the Air Force. The Government has certain rights in the invention.

TECHNICAL FIELD

The invention relates generally to constant envelope transmissions and, in particular, to a Phase-Optimized Constant Envelope Transmission (POCET) technique for generating a composite signal through phase modulation of a finite set of composite signal phases determined through optimization (minimization) of an objective function of the composite signal envelope, subject to a plurality of intra-signal constraints for the component signals and either zero or one or more inter-signal constraints between component signals of the composite signal.

BACKGROUND ART

In prior art constant envelope transmission methods, such as Interplex modulation, Coherent Adaptive Subcarrier Modulation (CASM), majority-vote modulation, or inter-vote modulation, the best-case power efficiency is dependent on the relative phase relationships between component signals and equality or disparity in component signal power levels. As discussed below, it would be helpful to be able to improve the efficiency of constant envelope transmission methods.

In mathematics, the general field of optimization, or mathematical programming, refers to the study of problems in which one seeks to minimize (or maximize) a function known in the art as "an objective function," sometimes called a "cost function," f(x), subject to a set of inequality and/or equality constraint equations, which can be expressed as $g_j(x) \leq 0$ (Inequality Constraints)

$h_j(x) = 0$ (Equality Constraints)

for the jth constraint of M total constraint equations. S. S. Rao, "Optimization theory and Applications," December, 1977.

There are a large number of sub-disciplines in mathematical programming including linear programming, nonlinear programming, quadratic programming, convex programming, integer programming, etc., depending on the form of the objective function. Mordecai Avriel (2003), Nonlinear Programming: Analysis and Methods, Dover Publishing (ISBN 0-486-43227-0). Other subdisciplines known in the art describe techniques that optimize the objective function over time, such as dynamic programming or optimal control theory. Techniques within these fields have not previously been applied to the generation of a constant envelope modulation. For example, nonlinear programming is a field of optimization techniques in which the objective function or the constraints or both contain nonlinear parts. One example of an optimization method from nonlinear programming is known as the penalty function method. In this method, an unconstrained minimization (i.e., in which the constraint is introduced indirectly) is used to solve a constrained minimization problem (i.e., where the constraint is introduced directly) by introducing a penalty factor, $\mu_k > 0$, and a penalty function p(x)>0 such that a penalized objective function is minimized iteratively (e.g., for penalty factor $\mu_k=1$ in the first iteration, 5 in the $2^{nd}$ iteration, 10 in the $3^{rd}$ iteration) so that the "penalty" for violating the constraint grows after each iteration. By the end of the process, the minimization is conducted with a large penalty if the constraint is violated; consequently, the result approaches the true minimum for introducing the constraints directly. David G. Luenberger (1973), Introduction to Linear and Nonlinear Programming, Addison-Wesley Publishing Company. The form of the objective function, including the penalty functions and penalty factors, is given below.

$$F(x) = f(x) + \mu_k \sum_{j=1}^{m} G_j[g_j(x)]$$

$G_j(x)$ the penalty function and is some function of the j'th constraint $\mu_k$ is the penalty parameter corresponding to the $k^{th}$ iteration It should be noted that there are many variations of the penalty function including absolute value penalty functions, quadratic loss penalty functions, etc. Just as there is no single equation that describes all of the sub-disciplines and methods in the theory of mathematical programming (optimization), there is also no single penalty function. These are all variations of solving the problem of minimizing an objective function subject to constraints.

In order to maximize efficiency of a nonlinear high-power amplifier, it is preferable to operate such amplifiers at or near saturation of their nonlinear region. Unfortunately, such operation leads to amplitude modulation to amplitude modulation (AM/AM) and amplitude modulation to phase modulation (AM/PM) distortions when the amplitude or envelope of the composite signal is not constant.

To reduce such distortions in space and ground-based communication and navigation transmission systems employing nonlinear amplifiers, two approaches have been undertaken. The first approach is to operate the amplifier in a linear region through output power backoff. This approach mitigates the effect of AM/AM and AM/PM distortions due to operation in the nonlinear region but is undesirable because it results in a loss of nonlinear amplifier efficiency as a result of not operating the amplifier at its maximum output power level (i.e., at saturation).

The second approach is to operate the amplifier in saturation while minimizing the variation in amplitude of the composite signal, or AM because such variation produces undesirable AM/AM and AM/PM distortions when the signal is passed through a nonlinear amplifier (as is the case in a typical space-based communication or navigation system). Several approaches have been previously proposed to maintain a constant envelope of the composite signal.

These approaches have been applied to modulate signals in Global Navigation Satellite Systems (GNSS) including the Global Positioning System (GPS), and the European Galileo navigation satellite system. These approaches maintain a constant carrier envelope according to a specific signal multiplexing (combining) technique. The approaches include: Coherent Adaptive Subcarrier Modulation (CASM), U.S. Pat. No. 6,430,213 to Dafesh; Quadrature Product Subcarrier Modulation (QPSM), U.S. Pat. No. 7,120,198 to Dafesh et al.; Interplex modulation, U.S. Pat. No. 6,335,951 to Cangiani et al.; weighted majority vote, U.S. Pat. No. 7,035,245 to Orr et al., or hybrids such as the inter-vote technique U.S. Pat. No.

7,154,962 to Cangiani et al. See also: J. Spilker et al., "Code Multiplexing via Majority Logic for GPS Modernization" Proceedings of the Institute of Navigation (ION) GPS-98, Sep. 15-18, 1998; P. A. Dafesh, T. M. Nguyen and S. Lazar, "Coherent Adaptive Subcarrier Modulation (CASM) for GPS Modernization," Proceedings of the ION National Technical Meeting, January, 1999; and P. A. Dafesh, "Quadrature Product Subcarrier Modulation," Proceedings of the IEEE Aerospace Conference, March 1999.

For these previous approaches, their efficiency is critically dependent on maintaining certain carrier phases and there is little flexibility to optimize the phase between different signal components, while minimizing the output power (producing a best-case power efficiency) required to transmit all of the signal components and pre-specified power levels. Maintaining phase relationships between signals is a desirable feature to meet legacy system requirements, such as the 90 degree phase relationship between P(Y) and C/A codes in the GPS system or to minimize interference between signals that overlap in spectrum.

In the case of GPS or GNSS systems in general, the number of signals that must be simultaneously transmitted in the future has increased from 2 to at least 5. This has resulted in a need to efficiently transmit these signals, the preferred method of which has been to employ some type of combining method that maintains a constant envelope composite signal amplitude (to eliminate AM-to-AM and AM-to-PM distortions), as described above. This combining approach should provide a composite signal without deleteriously impacting the power efficiency, defined by the following equation as the ratio of the sum of the component signal powers divided by the power of the composite signal:

$$\eta = \left( \frac{\sum_{n=1}^{N} |\text{corr}_n|^2}{A^2} \right).$$

Here $P_{dn}=|\text{corr}_n|^2$ is the desired value of the n'th component signal power, as measured by a correlation receiver matched to the component signal and $P_T=A^2$ is the total power of the composite transmitted signal, where A is the envelope (amplitude) of the composite signal. $\text{Corr}_n$ is the expected complex correlation level for the n'th component signal of N signals in the composite signal.

Additional requirements, such as the desire to maintain certain signal phase relationships, allow for adaptive signal power levels; and the possibility of increasing the number of signals in the future has led to increased signal losses and potentially severe self interference effects resulting from inter-modulation products inherent in these prior-art combining (modulation) methods. The methods also become increasingly difficult to optimize as the number of signals increases and are not well suited to combining other than BPSK signals. For example, the desire to broadcast composite signal envelope including Code Division Multiple Access (CDMA) waveforms (composed of multiple orthogonal pseudorandom noise code signals) and Orthogonal Frequency Division Multiplexing (OFDM) waveforms (composed of multiple orthogonal component signals at different frequencies) using nonlinear high power amplifiers operating near saturation makes it desirable to develop an efficient modulation method that may be applied to the optimization of a wide range of signal types, signal levels, phase relationships, and number of signals. Such methods may be used to efficiently transmit signals for application to both terrestrial wireless and space-based communication and navigation systems.

SUMMARY OF THE INVENTION

Embodiments described herein relate to a Phase-Optimized Constant Envelope Transmission (POCET) modulation methodology that optimizes the combining of several signal components, subject to a plurality of intra-signal constraints for the component signals, such as component signal power level, and either zero or one or more inter-signal constraints between component signals, such as the phase relationships between any two component signals. In an example embodiment, the receiver for each component of the signal is assumed to correlate with its corresponding pseudorandom noise (PRN) spreading code, without knowledge of the other codes. This is possible because the component signals being combined are orthogonal in nature (or approximately orthogonal). In another example embodiment, different PRN codes are separated in frequency (i.e., on different carriers) such that the composite signal maintains a constant envelope. In alternative embodiments, other means of orthogonality may be used to separate component signals, such as matched filtering of orthogonal frequency components. This embodiment would apply, for example, to generation of OFDM in a constant-envelope manner. Many variations of this approach may also be possible, including detection of power in individual signals through separation in time, phase, and polarization, as well as approximately orthogonal patterns in these quantities, as is the case in frequency-hopped spread spectrum signaling. Such component signal separations allow one to mathematically formulate different power constraint equations that relate the complex voltage, $(V_1+jV_Q)_n = \text{Re}\{\text{Corr}_n\}+j\text{Im}\{\text{Corr}_n\}$ (or power=$|V_1+jV_Q|_n^2$) of a given signal component to the envelope and carrier phase of the composite signal.

In an example CDMA satellite transmitter implementation, a fixed table of transmitted phase values, one for each combination of bits of binary PRN spreading codes, is computed. By way of example, the carrier is phase modulated by a complex rotation obtained by table lookup as a function of the code bits. The table of phase values is obtained through the above mentioned optimization scheme to minimize the constant-envelope transmit power subject to intra-signal constraints of the specified component signal power levels. Alternative embodiments may also constrain the relative signal phase relationships to provide one or more inter-signal constraints. For example, the phase difference between one or more signals may be constrained to 90 degrees.

The techniques described herein are applicable to efficiently combining both spread and unspread signals and can be used to generate a composite signal having a best-case power efficiency for any arbitrary set of desired component signal power levels, independent of the equality or disparity in component signal power levels. The techniques described herein produce a constant envelope modulation which is desirable for transmission of signals through a nonlinear amplifier, such as those used in space-based communication systems, in order to avoid deleterious effects of amplitude modulation to amplitude modulation (AM/AM) and amplitude modulation to phase modulation (AM/PM) distortions when the composite signal is passed through an amplifier operating in its nonlinear region.

In an example embodiment, an apparatus for generating a composite signal includes electronics configured to modulate a carrier utilizing a finite set of composite signal phases to generate a composite signal, the finite set of composite signal phases being determined through an optimization process that minimizes a constant envelope for the phase modulated carrier, subject to intra-signal constraints for the component signals (e.g., on desired signal power levels of the signals to be combined). In various embodiments, the optimization process is further subject to one or more inter-signal constraints between the component signals (e.g., defining the relative phase relationships between the component signals).

In an example embodiment, an apparatus for generating a composite signal from a plurality of component signals includes electronics configured to modulate a carrier utilizing a finite set of composite signal phases to generate a composite signal, the finite set of composite signal phases being determined through an optimization process that minimizes a constant envelope of a phase modulated carrier, subject to a plurality of constraints on desired signal power levels for the component signals. In an example embodiment, the optimization process is further subject to one or more constraints on phase relationships between the component signals.

In an example embodiment, a method for generating a composite signal from a plurality of component signals includes the step of modulating a carrier utilizing a finite set of composite signal phases to generate a composite signal, the finite set of composite signal phases being determined through an optimization process that minimizes a constant envelope of a phase modulated carrier, subject to a plurality of constraints on desired signal power levels for the component signals, and either zero or one or more constraints on phase relationships between the component signals.

A generalized embodiment for the case of PRN spreading signals is the case where the spreading code is an M-ary modulation with $M \geq 2$. For example, for QPSK spread spectrum, M=4, for BPSK spread spectrum, M=2. In this case, a method for forming a composite signal from M-ary modulated component signals includes the steps of: enumerating $M^N$ phase states for combining N signals with M possible signal phases; formulating N intra-signal constraint equations, each as a function of the $M^N$ phase states, to provide intra-signal constraints on the signals; formulating $K \leq N(N-1)/2$ inter-signal constraint equations, where K=0 or a positive integer, each as a function of the $M^N$ phase states, to provide inter-signal constraints between the signals; performing an optimization process to minimize a constant envelope for a phase modulated carrier, subject to the intra-signal constraints on the signals and the inter-signal constraints between the signals; and modulating an RF carrier using phase states determined through the optimization process to produce a composite signal. It should be noted that K=0 is the special case where there are no inter-signal constraints. By optimizing the composite signal power, the amplitude (envelope) of the composite signal is also optimized.

BRIEF DESCRIPTION OF THE DRAWINGS

FIG. 2 illustrates an example embodiment of an optimized phase table for four signals;

FIG. 3 shows a 3 signal, BPSK example of possible phase states;

DISCLOSURE OF INVENTION

The invention described herein involves a methodology of multiplexing several binary signals using a number of intra-signal (e.g., signal power) and either zero or one or more inter-signal (e.g., phase difference between any two signals) constraints to produce a constant-envelope composite signal with optimized signal phase relationships and minimum required composite signal power. This approach is called the Phase-Optimized Constant Envelope Transmission (POCET) method. The advantage of this scheme is that it minimizes the required composite signal power to transmit the selected component signals at the specified intra-signal constraints for each component signal and either zero or one or more inter-signal constraints between component signals. The receiver for any selected signal may operate without knowledge of the other signals or signal phase relationships. In general, component signal power is one of many possible intra-signal constraints. The method is applicable to both spread and unspread signals having a finite number of phase values, and any number of component signals can be combined at arbitrary specified power levels and with any number of phase relationships.

Figure 1:
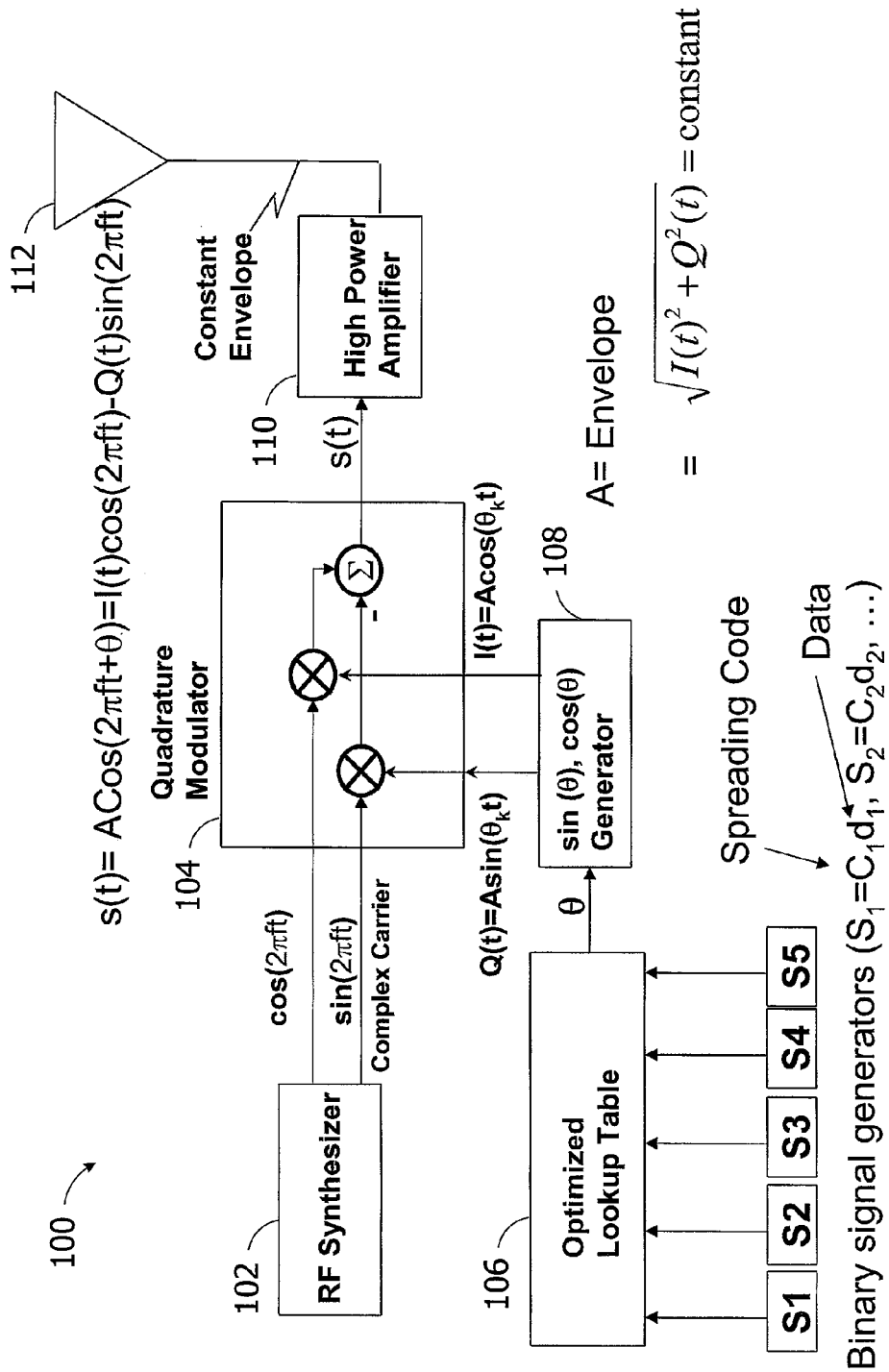
FIG. 1 illustrates an example embodiment of a Phase-Optimized Constant Envelope Transmission (POCET) system.

Referring to FIG. 1, in an example embodiment, a POCET system 100 includes a RF synthesizer 102, a quadrature modulator 104, an optimized lookup table 106, $\sin(\theta)$, $\cos(\theta)$ generator 108, a high power amplifier 110, and an antenna 112 configured as shown. The RF synthesizer 102 generates complex carrier signals, which are provided to the quadrature modulator 104. As described herein, outputs of the binary signal generators (S1, S2, ... SN) are inputs to the optimized lookup table 106. The $\sin(\theta)$, $\cos(\theta)$ generator 108, in turn, uses outputs from the optimized lookup table 106 to generate the Q(t) and I(t) inputs to the quadrature modulator 104. The quadrature modulator 104 outputs the composite signal, s(t), which is provided as an input to the high power amplifier 110. An alternative implementation directly phase modulates the carrier by the phase $\theta$. For example, in a digital implementation, a digital direct synthesizer (DDS) is configured to directly phase modulate the carrier by the stored phase value as an implementation alternative to performing the mathematically equivalent QAM modulation shown in FIG. 1.

In an example embodiment, the POCET modulator is configured such that four Binary Phase Shift Keying (BPSK) spread signals are combined. The POCET modulator can also be extended to a larger number of signals. For example, consider the combining of GPS civilian coarse-acquisition (C/A), Modernized L1 civilian signal data and pilot codes signals, L1Cd and L1Cp respectively, and the military precision, P(Y) and Military (M) code signals. These signals may be combined using the herein described POCET invention to combine the 5 binary PRN code signals L1Cd, L1Cp, C/A, P(Y) and M code. POCET may be compared to the prior-art Intervote approach. In the Intervote approach, assume that (L1Cd, C/A, L1Cp) are majority voted with M and P(Y) in phase quadrature according to the methods of U.S. Pat. No. 7,154,962. The Intervote technique is known to be an efficient means of combining 5 signals. Using the POCET modulation method, an efficiency improvement (reduction of total power) of roughly 10% (0.4 dB) is achieved as compared to the Intervote technique. Moreover, for the case of three signals, POCET is found to provide the same efficiency of three-signal Interplex, which is known to be the most efficient technique to combine three signals, but without the ability to optimize the phase relationships between signals. This is important, for example, in the case of the legacy GPS P(Y)-code and C/A code ranging signals that must retain a 90 degree phase relationship.

The POCET techniques described herein involve multiplexing several digital signals and provide an optimized combination of any finite number of component signals with desired intra-signal constraints (e.g. desired power levels), for a finite number of phase states, subject to zero or one or more desired inter-signal constraints (e.g., specified phase differences between selected pairs of signals), while maintaining a constant envelope (composite amplitude) and minimizing the envelope of the composite signal and thereby maximizing the transmitter efficiency. In the above mentioned example embodiment (combining 5 bi-phase spreading signals), a fixed storage table of phase values is precomputed to phase modulate the carrier as a deterministic function of the bits of the baseband signal components (e.g., $2^N$ phase values with N binary signals; phase changes when a chip switches polarity). Thus, in an example embodiment, a result of POCET combining is a deterministic table of phase values.

In the present example embodiment, binary spreading codes are assumed. Assuming all N combinations are equally likely, which is valid for approximately random PRN spreading codes, the average complex correlation for signal n, by definition the quantitative measure of performance of the correlation receiver for binary signaling, is:

$$\text{Corr}_n = \frac{A}{2^N} \sum_{k=0}^{2^N-1} [1 - 2b_n(k)] \exp(j\theta_k),$$

where A is the constant envelope, $\theta_k$ is the pre-computed $k^{th}$ phase value stored in the table and $b_n(k)$ denotes the k-th bit of the binary representation of N signals being combined. ([1−2 $b_n(k)$] converts $b_n(k)$ from a 0/1 representation to +/−1 non-return-to-zero representation). The data bit values have been excluded from the above expression because correlation is performed over a time period which is coherent with the data bit and therefore only affects the polarity of the complex correlation, but not its magnitude (which is used to determine the power constraint equations).

Note that the $\{\theta_k\}$ phase values (k=1, . . . , 2N−1) are determined as a result of the optimization process and take on different values in time depending upon the pseudorandom combination of bits $b_n(k)$ for n=1, . . . , N. The implementation of the satellite transmitter causes the carrier to be phase modulated by rotating the carrier phase according to $e^{\theta_k}$ or, equivalently, by quadrature amplitude modulation of the in-phase and quadrature form, $\cos(\theta_k)+j\sin(\theta_k)$, yielding a transmitted signal of s(t) given by:

$$s(t) = A\cos(2\pi f_c t + \theta_k(t))$$
$$= A\text{Re}\{e^{j\theta_k(t)} e^{j2\pi f_c t}\}$$
$$= A\text{Re}\{[(\cos(\theta_k(t)) + j\sin(\theta_k(t))] e^{j2\pi f_c t}\}$$
$$= A\cos(\theta_k(t))\cos(2\pi f_c t) - A\sin(\theta_k(t))\sin(2\pi f_c t)$$

where the phase values, $\theta_k=\theta_k(t)$, are extracted from the lookup table as a function of the spreading code bits being combined at any given time t, and A is the envelope of the composite signal, s(t), also called its amplitude. The amplitude A is >0.

The lookup table of phase values is determined from an optimization algorithm to minimize the constant envelope A, while maintaining the constraints of the specified power levels and phase relationships of the average correlations. FIG. 2 illustrates an example of an optimized phase table for four signals, which enumerates the possible values of $b_n(k)$. In this example, N=4, and the columns are numbered from left to right, n=1, 2, 3, 4. The transmitted phase angles are listed in the rightmost column from k=0, 1, 2 . . . , 15 and corresponding to each possible combination of the 4 bit values from the binary PRN code signals: C/A, P(Y), L1Cp, and L1Cd. A new phase table is produced for each set of inter-signal and intra-signal constraints.

In an example embodiment, an algorithm that performs the constrained optimization is based on an unconstrained optimization search of the objective function that incorporates the constraints according to the penalty function technique, where the penalty function is zero when the constraints are satisfied and positive otherwise. A quasi-Newton search algorithm can be used to minimize the objective function of several variables without requiring explicit computation of the gradient of the function. Other optimization approaches can also be used. In this case, the variables are the phase angles of the look-up table and the envelope A to be minimized. The phase angle values are significant modulo-360° but are unconstrained for the search. A common problem with the minimization search is that the algorithm may converge to a local minimum rather than the desired global minimum. An approach to circumvent this difficulty is to perform a multiplicity of searches starting from different starting points, where each starting point initializes the phase values to random values in the range 0 to 360°. With N binary codes, the number of independent variables for the optimization search is $2^{N-1}-1$, because the phase values occur in symmetrical pairs differing by 180° and one phase value can be arbitrarily set to zero, as is evident from table 2. The total number of phase values in the lookup table is $2^N$. In the example above, the optimization is performed over 7 independent phase angles.

An example multiplexing scheme to combine GPS navigation signals provides an efficient method of optimally combining three or more digital signals into a composite signal of constant envelope, with minimum total power, and with arbitrary power and phase constraints, such as requiring the GPS C/A code signal to be in phase quadrature (90 degrees out of phase) with the P(Y) code. The features of this method are not specific to its application to GPS or a fixed number of signals.

In an example embodiment, a constrained optimization (nonlinear programming problem) is performed as set forth below:

Minimize A as a function of $\theta_k$ for k=0, . . . , $2^{N-1}-1$, subject to the constraints $$P_{dn} = |\text{corr}_n(\theta)|^2 = \frac{A^2}{2^N} \left| \sum_{k=0}^{2^N-1} [1 - 2b_n(k)] \exp(j\theta_k) \right|,$$

for desired power levels, and $$Im\{e^{-j\Delta\phi_{nl}} corr_n(\theta) corr_l(\theta)^*\} = 0$$

$$Re\{e^{-j\Delta\phi_{nl}} corr_n(\theta) corr_l(\theta)^*\} > 0$$

are equations defining an inter-signal phase constraint between component signals, where $\theta = \langle \theta_0, \ldots, \theta_{2^{N-1}} \rangle$ is a vector containing all of the possible composite signal phases, as exemplified transmitted phase angle values in FIG. 2. Where:

A is the constant envelope of phase-modulated carrier;

$\theta_k$ is phase value for $k^{th}$ combination of binary chips at time $t_k$;

$\text{corr}_n(\theta)$ is the complex correlation of the composite signal to the $n^{th}$ replica of component signal n;

$\text{corr}_l(\theta)$ is the complex correlation of the composite signal to the $l^{th}$ replica of component signal l; and $\Delta\phi_{nl}$ is the phase difference inter-signal constraint between component signals k and l.

$t_{k+1} - t_k = \Delta T_k$ is the duration of the shortest PRN chip of the N PRN codes to be combined, where the conventional definition of a chip is used corresponding to the smallest interval of time over which the signal transmitted component signal is constant. It should be noted that an alternative embodiment minimizes $A^2$ instead of A.

In an example embodiment, it is desirable to combine 4 GPS PRN code signals including C/A code, P(Y) code, L1Cp code and the L1Cd code. For this case, the intra-signal power constraints are specified by:

C/A=0 dB;
P(Y)=−3 dB;
L1C$_P$=0.25 dB; and
L1C$_d$=−4.5 dB.

And the specified phase constraints are:

C/A to P(Y)=90°;
C/A to L1C$_P$=90°; and
C/A to L1Cd=90°.

In the example embodiments, methods of combining three or more component signals have applicability to global navigational satellite systems (GNSS) and to other spread spectrum signaling in which more than two signals are combined with inter-signal phase constraints in a constant-envelope composite signal having minimum power. In example embodiments, the methods of signal combining described herein are applicable to modulation of multiple wireless communication signals in a constant envelope composite signal including Orthogonal Frequency Division Multiplexing (OFDM) or Code Division Multiple Access (CDMA) systems and signaling standards, or other standards that would be apparent to one skilled in the art.

In an alternative embodiment, the average component signal correlation for a composite signal comprising N, M-ary spreading signals ($M^N$ phase states) is determined as follows:

$$\text{Corr}_n = \frac{A}{M^N} \sum_{k=0}^{M^N-1} [C_{In}(k) - jC_{Qn}(k)] \exp(j\theta_k)$$

For component signals employing binary signaling, M=2. For signals employing QPSK spreading codes, M=4. Here $C_I(k) - jC_Q(k)$ is the complex representation of an M-ary spreading code. The data bit values have been excluded from the above expression because correlation is performed over a time-period, which is coherent with the data bit and therefore only affects the polarity of the complex correlation, but not its magnitude (which is used to determine the intra-signal power constraint equations).

The general case applies to any M-ary digital modulation, e.g., QPSK (M=4), 8-PSK (M=8), etc.

In an example embodiment, 5 spread spectrum signals are combined into a composite CDMA signal; however, the general method applies to a combination of forms of multiplexed signals (e.g., Frequency Division Multiple Access or FDMA) or any other plurality of component signals. In this 5 signal binary example, the average component signal correlation for a composite signal is determined as follows:

$$\text{Corr}_n = \frac{A}{2^N} \sum_{k=0}^{2^N-1} C_{In(k)} \exp(j\theta_k) \quad C_{In(k)} = 1 - 2b_n(k) = \pm 1$$

$$\text{Corr}_n = \frac{A}{32} \sum_{k=0}^{31} [1 - 2b_n(k)] \exp(j\theta_k)$$

$$= \frac{A}{16} \sum_{k=0}^{15} [1 - 2b_n(k)] \exp(j\theta_k)$$

In this example, the series is reduced as shown with symmetry being used to reduce the number of independent values of $\theta_k$ from 32 to 16, and one of these phases may be set to 0 degrees as an arbitrary reference value.

FIG. 3 shows a 3 signal, BPSK example of possible phase states. The 3 signal table is shown for the sake of simplicity and convenience. For a 5 signal example (N=5), the table would include two additional columns and a total of 32 ($2^N$) rows.

Further with respect to the optimization (e.g., minimization) of an objective function, in an example embodiment, an objective function, f(x), is subject to a set of inequality and/or equality constraint equations, which can be expressed as $g_j(x) \leq 0$ (Inequality Constraints)

$h_j(x) = 0$ (Equality Constraints)

wherein j=1, 2, . . . N.

Various optimization sub-disciplines including nonlinear programming can be used where the objective function is nonlinear. In an example embodiment, a penalty function method is employed as the optimization approach. By way of example, $$F(x) = f(x) + \mu_k \sum_{j=1}^{N} G_j[g_j(x)]$$

$G_j(x)$ the penalty function and is some function of the j'th constraint $\mu_k$ is the penalty parameter corresponding to the $k^{th}$ iteration Power to be minimized $$F(\theta) = A^2$$

Received power constraints    Phase constraints $$+ \mu_a \sum_{n=1}^{m} (|\text{corr}_n(\theta)| - \text{corrd}_n)^2 + \mu_b \sum_{n=1}^{N} \sum_{l=n+1}^{N} \text{Im}\{e^{-j\Delta\phi_{nl}} \text{corr}_n(\theta) \text{corr}_l(\theta)^*\}^2$$

$\Delta\phi_{nl}$ = Desired inter-signal phase constraints between signals $\theta = (\theta_1, \theta_2, \theta_3, \ldots \theta_M)$ and $Corrd_n$ is the desired intra-signal power level for each component signal and is determined from the desired component signal power level. Other optimizations and penalty functions may also be employed.

Example applications of the methodologies described herein include, but are not limited to, the modulation of N different spreading signals such as is the case for the modernized GPS system, the European Galileo navigation, or other future foreign navigation systems such as China's Compass system. The methodologies described herein are generally applicable to the generation of a constant-envelope composite signal for any spread-spectrum (CDMA) system including wireless CDMA signaling standards employed in 2.5G and 3G wireless standards. The methodologies described herein can also be applied to OFDM, a technology expected to be used in 4G and LTE wireless or similar systems (cell phones, wireless routers, etc.), as well as transmissions of these signals from space (through a nonlinear amplifier).

Figure 4:
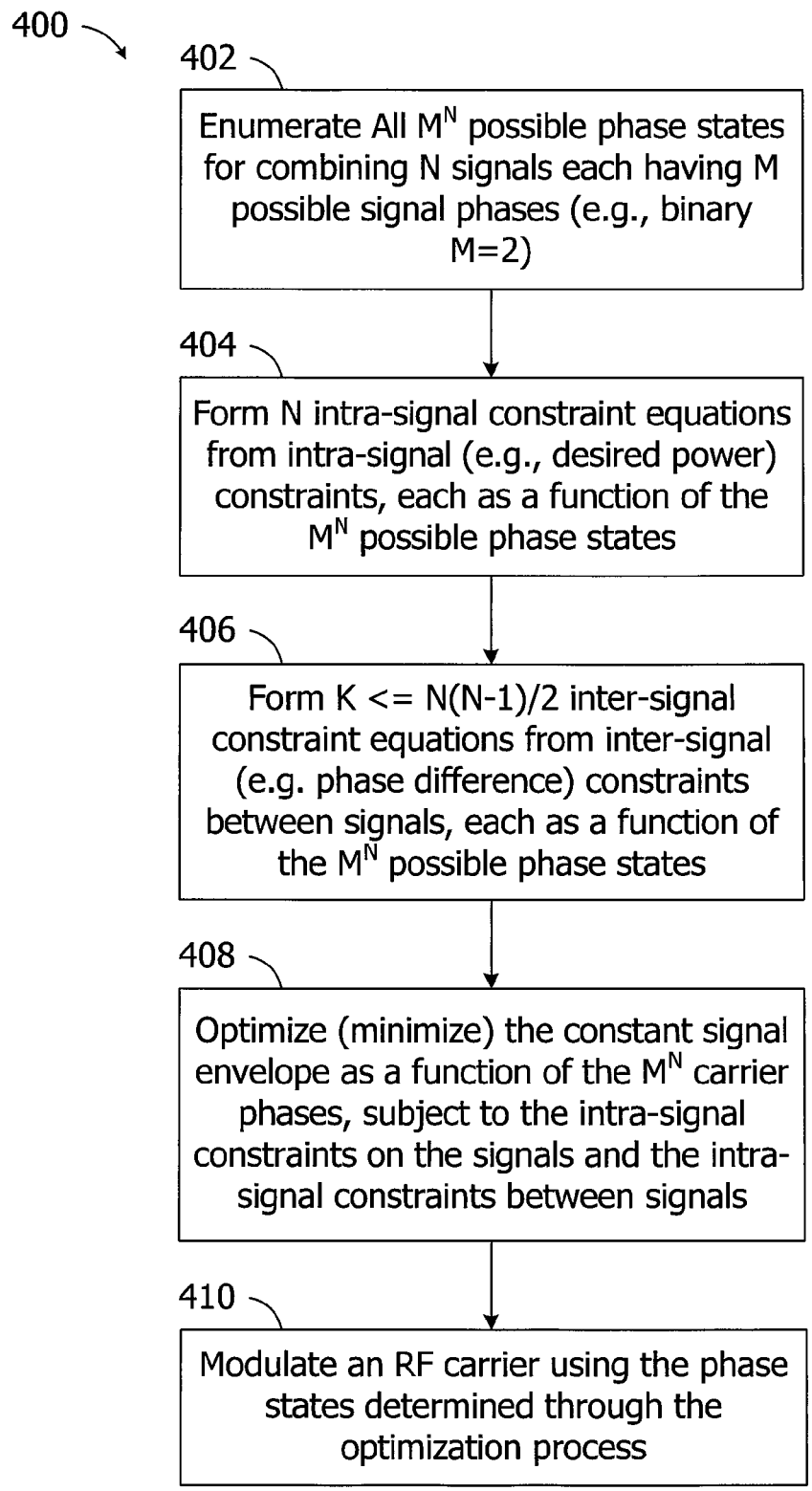
FIG. 4 is a flow diagram of an example method of forming a composite signal from N component signals.

Referring to FIG. 4, in an example embodiment, a method 400 of forming a composite signal from N component signals is represented in the form of a flow diagram. At 402, all $M^N$ possible phase states for combining N signals each having M possible signal phases (e.g., binary M=2) are enumerated. At 404, N intra-signal constraint equations are formed from intra-signal (e.g., desired power) constraints, each as a function of the $M^N$ possible phase states. At 406, $K \leq N(N-1)/2$ inter-signal constraint equations, where K=0 or a positive integer, are formed from inter-signal (e.g. phase difference) constraints between signals, each as a function of the $M^N$ possible phase states. Thus, either zero or one or more inter-signal constraints are formed. At 408, the constant signal envelope is optimized (minimized) as a function of the $M^N$ carrier phases, subject to the intra-signal constraints on the signals and the inter-signal constraints between signals. At 410, an RF carrier is modulated using the phase states determined through the optimization process. Alternative inter-signal and intra-signal constraints may also be used.

As previously described, POCET enables combining of several binary signals into a constant envelope while maintaining desired intra-signal and inter-signal constraints. To combine several binary signals, POCET, as previously described, stores a pre-computed phase table that is a function of the values of the binary chips of the signals to be combined. For example, with four binary signals, the phase table has $2^4=16$ entries, each entry specifying the transmitted phase corresponding to one of the possible set of values of the four binary chips. Presuming random chip values, a computational optimization technique minimizes the required constant-envelope power ($=A^2$) while maintaining the specified intra-signal and intra-signal constraints. In an example embodiment, the intra-signal constraints are the desired component signal powers and intra-signal constraints are the desired phase difference constraints between signals (relative phase constraints). As previously developed, POCET assumed that these constraints do not vary in time. In a generalization of the POCET scheme, the constraints may also be time varying. For the example of inter-signal phase constraints between signals, this generalization may be used to combine component PRN spreading code signals at different frequencies to produce a constant-envelope signal. In such a variation, additional optimizations (or phase tables) are generated corresponding to the number of phase steps used to represent a frequency difference between component signals. The following describes a technique to combine signals at different carrier frequencies onto a constant-envelope carrier suitable for efficient high-power transmission from a satellite.

The capability of POCET to maintain one or more phase constraints is necessary to enable the extension of this technique described below. While the following descriptive example refers to combining chips of binary PN spread-spectrum signals typically used for navigation and communication, it should be understood that the technique can be generalized to higher-order modulations.

The process of combining two or more signals of different carrier frequencies into a constant envelope takes into consideration the fact that the phase relation between the signals is continually changing at a rate equal to the difference of the carrier frequencies. Therefore, the phase difference constraint, $\Delta\phi_{nl}$, takes on V different values, $\Delta\phi_{nl}=\Delta\phi_{n1}$, $\Delta\phi_{n2}, \ldots, \Delta\phi_{nP}$, where P is the number of phase steps used to determine the carrier frequency difference between component signals and one optimized POCET composite carrier phase table is needed for each phase step.

In an example embodiment, the POCET technique is extended to this signal-combining problem by quantizing the continuous phase rotation into finite phase steps and then performing a POCET optimization of the combining for the fixed phase relation between the signals at each phase step. Because this requires multiple POCET solutions for the different phase relations, in an example embodiment, relatively coarse phase steps can be used. For example, quantizing the phase rotation to steps of 10° ensures a negligible correlation loss, calculated to be 0.01 dB presuming a uniform distribution of phase error with respect to the continuous phase rotation. Taking the example of two carrier frequencies to be combined, using a phase step of 10°, 18 phase tables are computed and stored for one cycle of phase rotation, noting that when the phase rotation increases by 180°, the binary chip values are complemented. For implementation convenience, in an example embodiment, the number of phase tables can be a power of 2, as discussed below.

An example of combining signals at different frequencies for a satellite implementation is now described. More specifically, in this example, the satellite implementation is configured to simultaneously transmit both the L1C navigation signal and the Global Navigation Satellite System (GLONASS) FDMA signal via a constant-envelope combined signal, which maximizes the efficiency of the high-power transmitter. The carrier frequency of the L1C signal is 1575.42 MHz. The chip rate of the L1C binary modulation is 1.023 Mchips/sec with BOC(1,1) chip modulations on the L1Cp signal and the L1Cd signal. The L1Cp signal also has a time multiplex of BOC(6,1). The carrier frequency of GLONASS FDMA is one of 14 values spaced by 0.5625 MHz in a band centered at about 1602 MHz. The highest GLONASS FDMA carrier frequency is 1605.375 MHz. The GLONASS FDMA signal combines two binary modulations, a civil signal with BPSK chip modulation at 0.511 Mchips/sec and a military signal with BPSK chip modulation at 5.11 Mchips/sec.

In this example, there are four signals to be combined. The L1Cd and L1Cp signals can be either at a relative phase shift of 0 or 90°. The relative phase shift between the civil and military GLONASS FDMA signals is assumed to be 90°. The GLONASS FDMA carrier must be represented with a minimum of two samples per cycle of phase rotation. A phase-stepping rate of 98.208 MHz=1.023 MHz×6×16 gives 3.28 samples per cycle and is a convenient multiple of the switching rate of the BOC(6,1) chip modulation. This sampling rate can be selected to combine the signals.

In this example, the specified powers are of −158.25 dBW for L1Cp, −163 dBW for L2Cd, −158.5 dBW for GLONASS FDMA civil, and −161.5 dBW for GLONASS FDMA military. In this example, a more efficient combining result for POCET is obtained specifying a phase shift of 0° between L1Cp and L1Cd rather than 90°. A POCET optimization was performed for each of 18 phase steps from 0 to 170° for the phase rotation of the GLONASS FDMA carrier relative to the L1C carrier. In the previously described POCET optimization, the first phase value in the phase table was set to zero; however, this is arbitrary. In this example embodiment, after obtaining the optimization solution at each phase step, the solution is phase-shifted by adding a constant to all of the phase values stored in the phase table so that the average correlation of L1Cp is maintained at a phase of 0° as the GLONASS FDMA carrier rotates.

Figure 5:
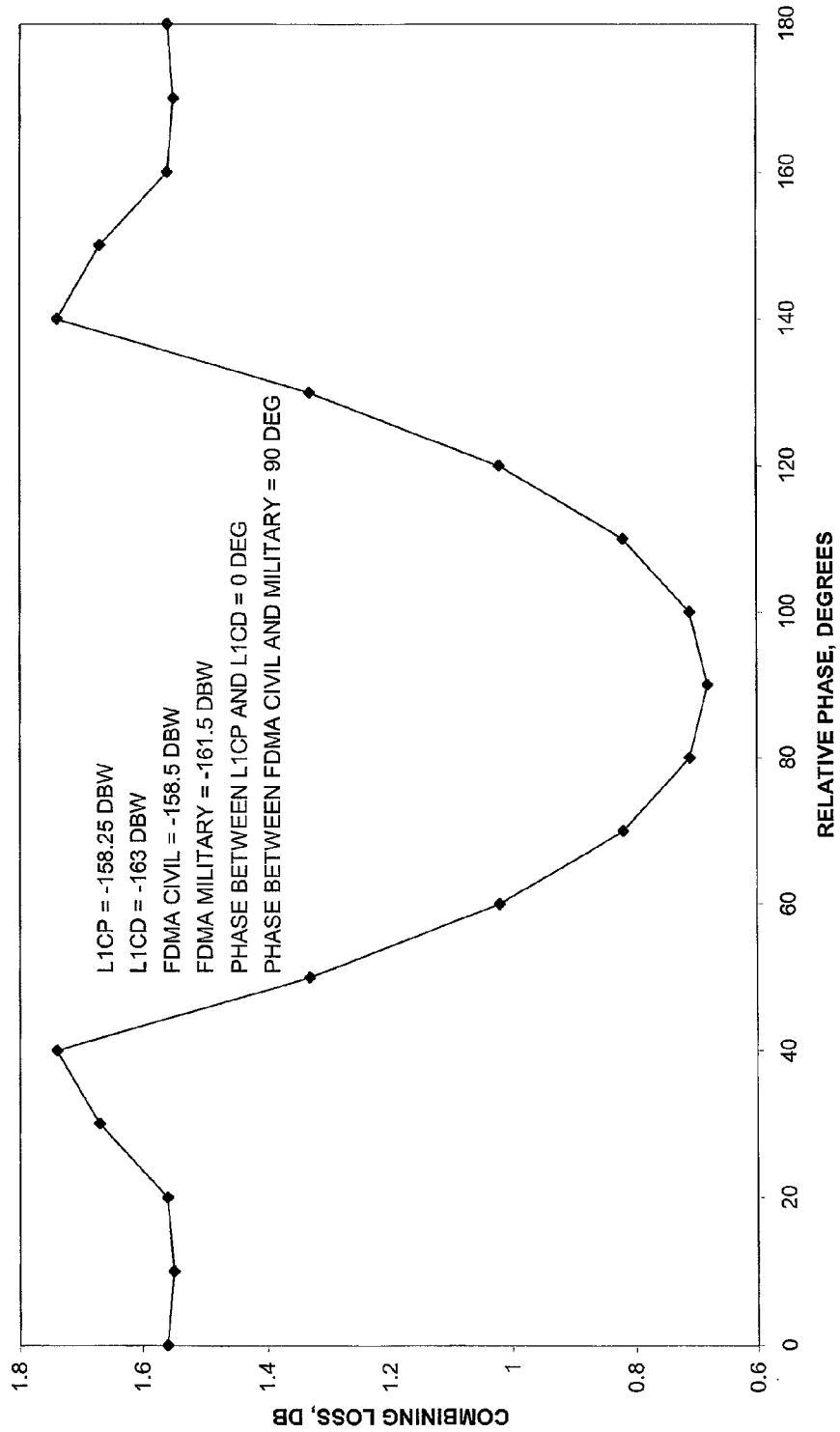
FIG. 5 is a plot that shows combining efficiency as a function of the phase difference between the L1C carrier and the GLONASS FDMA carrier.

FIG. 5 is a plot that shows combining efficiency as a function of the phase difference between the L1C carrier and the GLONASS FDMA carrier. The symmetry of the plot is due to the fact that the combining efficiency is the same for negative and positive phase differences.

The signal combining of this example was simulated at the sampling rate of 98.208 MHz. The assumed GLONASS FDMA carrier frequency=1605.375 MHz, which is the maximum offset from the L1 carrier of 1575.42 MHz and, therefore, the most stringent for the digital implementation. The simulation incorporated 18 POCET phase tables, one table for each quantized step of the phase rotation between the two carriers. Assuming random binary codes, the average correlation was computed for each of the four signals, summing at the sampling rate. The simulation computed the GLONASS FDMA correlations assuming a continuously-rotating phase of the replica carrier in the receiver at each sample rather than the quantized phase shift used for table lookup in the modulator. The switching times of the L1C binary modulations were synchronous with the sampling rate. The switching times of the GLONASS FDMA binary modulations were slightly displaced as necessary to synchronize with the sampling rate. The effect of this quantization of the chip switching time was ignored when computing the GLONASS FDMA correlations. The power spectral density of the combined signal was computed using a FFT of size 8192, which gave a frequency bin resolution of 98.208 MHz/8192=11.99 KHz. The power from many successive FFT computations was averaged over a long simulation run.

Referenced to the constant-envelope transmitted power of the combined signal, the simulation produced correlation powers of −5.67 dB for L1Cp, −10.41 dB for L1Cd, −5.93 dB for GLONASS FDMA civil, and −8.94 dB for GLONASS FDMA military. As desired, the phase shift between the L1Cp and the L1Cd average correlations is almost exactly 0°, and the phase shift between the GLONASS FDMA civil and the GLONASS FDMA military average correlations is almost exactly 90°. Because ideal linear combining of the four signals would produce a correlation power of −4.40 dB for L1Cp, the combining loss is 1.27 dB.

Figure 6:
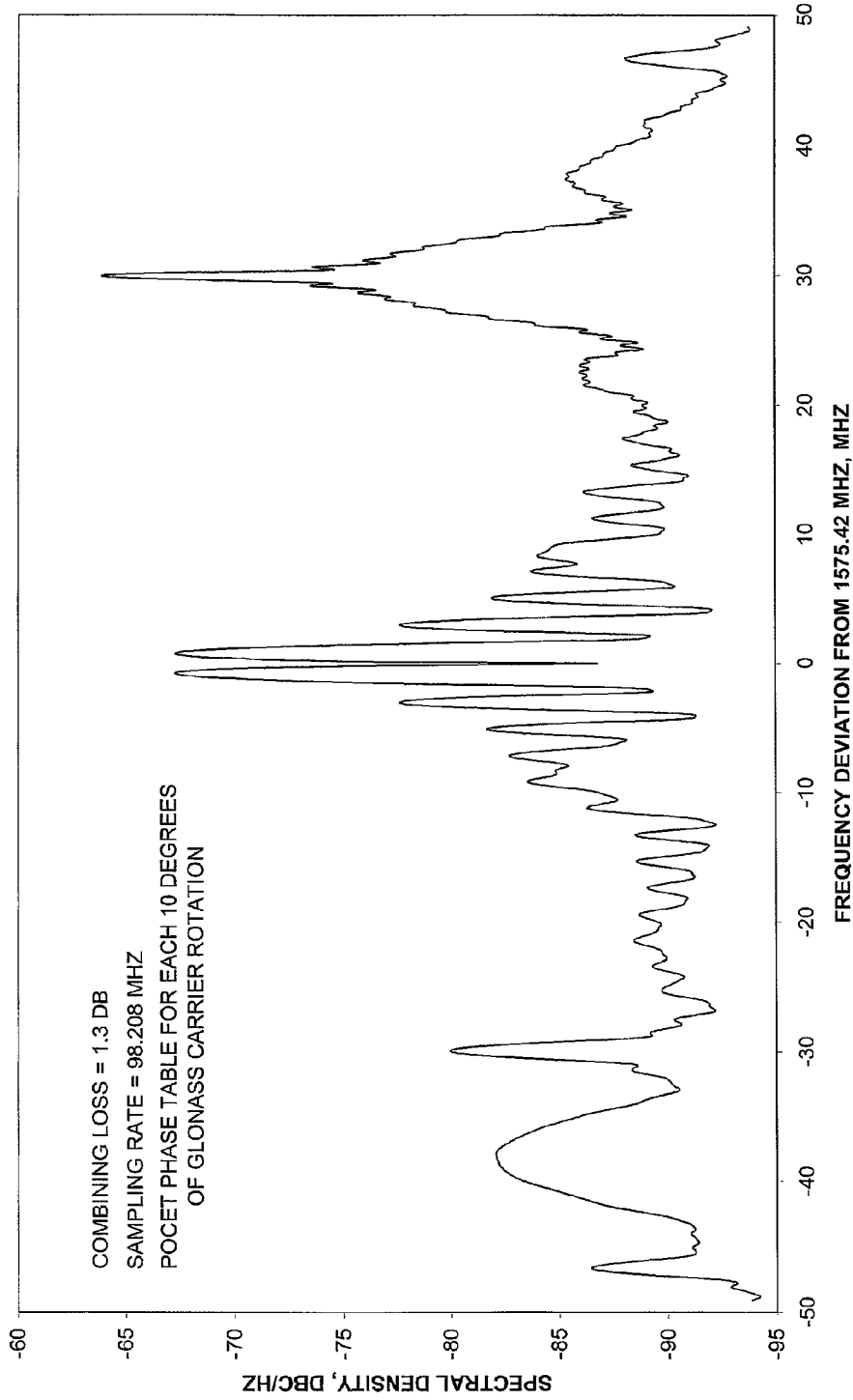
FIG. 6 is a plot that shows the power spectral density for constant-envelope combining of the L1C carrier and the GLONASS FDMA carrier.

FIG. 6 is a plot that shows the power spectral density obtained from the simulation. The BOC(6,1) chip modulation was not included in this simulation, although it would be a straightforward addition. The spectral shape of BOC(1,1) is evident at the L1 carrier. At the GLONASS FDMA carrier, the spectral shape is the sum of BPSK(1) and BPSK(10). The combining does produce a low level of spurious components.

In this example, the L1 carrier frequency and the code rate clock to drive the L1C code generators can be synthesized from a frequency standard at 10.23 MHz. This frequency standard can be divided down to 1.023 MHz to drive the L1C code generators, multiplied by 2 to provide BOC(1,1) sub-carrier switching, further multiplied by 6 to provide BOC(6,1) subcarrier switching, and additionally multiplied by 8 to provide the sampling rate of 98.208 MHz. The frequency standard can be divided down to 1 KHz, multiplied to 0.511 MHz, and further multiplied to 5.11 MHz to produce the code clocks to drive the GLONASS FDMA code generators. In an example embodiment, the GLONASS FDMA carrier frequency does not physically exist separate from the POCET modulator circuitry, rather its instantaneous phase is digitally represented in a carrier numerically-controlled oscillator (NCO) accumulating at the sampling rate of 98.208 MHz. This approach results in a composite signal that contains a digitally generated FDMA carrier modulated by the composite FDMA spreading signals. In an example embodiment, the number of bits in the phase accumulator of the NCO must be sufficiently high to obtain the requisite frequency accuracy, for example, 36 bits enables a GLONASS FDMA carrier frequency accuracy of $10^{-10.8}$. To maintain coherence between carrier and code, the GLONASS FDMA code-rate clock can be derived from a NCO accumulating at the sampling rate of 98.208 MHz instead of using the synthesis scheme described above.

In an example embodiment, the GLONASS FDMA carrier phase in the carrier NCO is used to select the correct POCET phase table. If the number of POCET tables is a power of 2, the selection can be done from the MSBs of the digital phase representation in the NCO, e.g., 5 MSBs will pick one of 32 phase tables. In the simulation, the GLONASS FDMA carrier NCO and code-rate NCO phase were computed by incrementing double-precision variables, thus providing 51 bits of accuracy for these frequencies.

The POCET extension to the problem of combining a multiplicity of signals at different carrier frequencies into a constant-envelope carrier is illustrated by studying the aforedescribed example of combining the L1C signal and a GLONASS FDMA signal, which have carrier frequencies differing by a maximum of about 30 MHz. In this example, the POCET optimization was performed at a finite number of quantized phase shifts between the carriers, as an approximation to continuous phase rotation. The combining result for this example had a combining loss of 1.27 dB and produced spurious components that were reasonably low. The implementation for this example used a sampling rate of 98.208 MHz. Frequency synthesis was from a 10.23 MHz standard to generate the L1C carrier and code rates. The GLONASS FDMA carrier and code rates were generated by NCOs accumulating at the sampling rate.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. An apparatus for generating a constant envelope composite signal from a plurality of component signals, comprising:
   a synthesizer configured to generated a carrier signal; and
   electronics configured to modulate the carrier signal utilizing a finite set of composite signal phases to combine three or more component signals, each having two or more possible phases to generate and maintain the constant envelope composite signal, the finite set of composite signal phases being determined through an optimization process that minimizes the constant envelope of the composite signal, subject to a plurality of intra-signal constraints for the component signals,
   wherein said optimization process includes optimization of an objective function of the constant envelope of the composite signal.

2. The apparatus for generating the composite signal of claim 1, wherein the optimization process is further subject to one or more inter-signal constraints between the component signals.

3. The apparatus for generating the composite signal of claim 1, wherein the component signals are satellite navigation signals.

4. The apparatus for generating the composite signal of claim 1, wherein the intra-signal constraints are formed from intra-signal desired power constraints, each of the intra-signal constraints being formed as a function of all possible phase states.

5. The apparatus for generating the composite signal of claim 4, wherein the intra-signal constraints are determined from the desired component signal power levels.

6. The apparatus for generating the composite signal of claim 1, wherein the finite set of composite signal phases are phase values precomputed as a deterministic function of the component signals to produce the constant envelope composite signal.

7. The apparatus for generating the composite signal of claim 1, wherein the optimization process includes utilizing a penalty function to produce a deterministic table comprised of the finite set of composite signal phases for modulating the carrier.

8. The apparatus for generating the composite signal of claim 1, wherein the constant envelope composite signal is formed from Orthogonal Frequency Division Multiplexing (OFDM) component signals.

9. The apparatus for generating the composite signal of claim 1, wherein the constant envelope composite signal is formed from Code Division Multiple Access (CDMA) component signals.

10. The apparatus for generating the composite signal of claim 1, wherein the component signals are pseudorandom noise (PRN) spreading codes.

11. The apparatus for generating the composite signal of claim 10, wherein the PRN spreading codes are at a plurality of different carrier frequencies.

12. The apparatus for generating the composite signal of claim 1, wherein the composite signal is derived from Frequency Division Multiple Access (FDMA) component signals.

13. The apparatus for generating the composite signal of claim 1, wherein each of the component signals is at a plurality of carrier frequencies.

14. The apparatus for generating the composite signal of claim 1, wherein the electronics include a modulator configured to utilize multiple finite sets of optimized phase tables, determined through additional optimization processes to accommodate different carrier frequencies.

15. The apparatus for generating the composite signal of claim 14, wherein a number of additional optimizations performed corresponds to a number of phase steps associated with the component signals at a plurality of different carrier frequencies.

16. The apparatus for generating the composite signal of claim 15, wherein the number of phase steps associated with the different carrier frequencies is determined by quantizing the continuous phase rotation of the carrier to ensure a negligible correlation loss.

17. An apparatus for generating a constant envelope composite signal from a plurality of component signals, comprising:
a synthesizer configured to generated a carrier signal; and
electronics configured to modulate the carrier signal utilizing a finite set of composite signal phases to combine three or more component signals, each having two or more possible phases to generate and maintain the constant envelope composite signal, the finite set of composite signal phases being determined through an optimization process that minimizes the constant envelope of the composite signal, subject to a plurality of constraints on desired signal power levels for the component signals,
wherein said optimization process includes optimization of an objective function of the constant envelope of the composite signal.

18. The apparatus for generating the composite signal of claim 17, wherein the optimization process is further subject to one or more constraints on phase relationships between the component signals.

19. The apparatus for generating the composite signal of claim 17, wherein the component signals are satellite navigation signals.

20. The apparatus for generating the composite signal of claim 17, wherein the optimization process is further subject to the constraints on desired signal power levels, each of the constraints being formed as a function of all possible phase states.

21. The apparatus for generating the composite signal of claim 20, wherein the constraints are determined from the desired signal correlation levels.

22. The apparatus for generating the composite signal of claim 17, wherein the finite set of composite signal phases are phase values precomputed as a deterministic function of the component signals to produce the constant envelope composite signal.

23. The apparatus for generating the composite signal of claim 17, wherein the optimization process includes utilizing a penalty function to produce a deterministic table comprised of the finite set of composite signal phases for modulating the carrier.

24. The apparatus for generating the composite signal of claim 17, wherein the constant envelope composite signal is formed from Orthogonal Frequency Division Multiplexing (OFDM) component signals.

25. The apparatus for generating the composite signal of claim 17, wherein the constant envelope composite signal is formed from Code Division Multiple Access (CDMA) component signals.

26. The apparatus for generating the composite signal of claim 17, wherein the component signals are pseudorandom noise (PRN) spreading codes.

27. The apparatus for generating the composite signal of claim 26, wherein the PRN spreading codes are at a plurality of different carrier frequencies.

28. The apparatus for generating the composite signal of claim 17, wherein the composite signal is derived from Frequency Division Multiple Access (FDMA) component signals.

29. The apparatus for generating the composite signal of claim 17, wherein each of the component signals is at a plurality of carrier frequencies.

30. The apparatus for generating the composite signal of claim 17, wherein the electronics include a modulator configured to utilize multiple finite sets of optimized phase tables, determined through additional optimization processes, to accommodate different carrier frequencies.

31. The apparatus for generating the composite signal of claim 17, wherein a number of additional optimizations performed corresponds to a number of phase steps associated with the component signals at a plurality of different carrier frequencies.

32. The apparatus for generating the composite signal of claim 31, wherein the number of phase steps associated with the different carrier frequencies is determined by quantizing the continuous phase rotation of the carrier to ensure a negligible correlation loss.

33. A method for generating a constant envelope composite signal from a plurality of component signals, comprising the steps of:
generating a carrier signal; and
modulating the carrier signal utilizing a finite set of composite signal phases to combine three or more component signals, each having two or more possible phases to generate the constant envelope composite signal, the finite set of composite signal phases being determined through an optimization process that minimizes the constant envelope of the composite signal, while maintaining a plurality of constraints on desired signal power levels for the component signals, and zero or more constraints on phase relationships between the component signals,
wherein said optimization process includes optimization of an objective function of the constant envelope of the composite signal.

34. The method for generating the composite signal of claim 33, wherein the component signals are satellite navigation signals.

35. The method for generating the composite signal of claim 33, wherein the component signals are pseudorandom noise (PRN) spreading codes.

36. The method for generating the composite signal of claim 35 wherein the PRN spreading codes are at a plurality of different carrier frequencies.

37. The method for generating the composite signal of claim 33, wherein each of the component signals is at a plurality of carrier frequencies.

38. The method for generating the composite signal of claim 33, further including the step of:
utilizing multiple finite sets of optimized phase tables, determined through additional optimization processes, to accommodate different carrier frequencies.

39. A method for forming a constant envelope composite signal from a plurality of N component signals, comprising the steps of:
enumerating $M^N$ phase states for combining the N component signals, each having M possible signal phases, where N is a positive integer $\geq 3$ and M is a positive integer $\geq 2$;
formulating N intra-signal constraint equations, each as a function of the $M^N$ phase states, to provide intra-signal constraints on the component signals;
formulating K inter-signal constraint equations, where $0 \leq K \leq N(N-1)/2$, each as a function of the $M^N$ phase states, to provide inter-signal constraints between the component signals;
performing an optimization process to minimize the constant envelope composite signal, subject to the intra-signal constraints on the component signals and the inter-signal constraints between the component signals; and
modulating a Radio Frequency (RF) carrier using the phase states determined through the optimization process to produce the constant envelope composite signal from the N component signals,
wherein performing said optimization process includes optimization of an objective function that minimizes the constant envelope of the composite signal.

40. The method for forming the composite signal of claim 39, wherein performing said optimization process includes optimization of the objective function for the power of the constant envelope composite signal.

41. The method for forming the composite signal of claim 40, wherein said optimization algorithm is used to minimize the objective function.

42. The method for forming the composite signal of claim 39, wherein performing said optimization process includes utilizing a penalty function method.

43. The method for forming the composite signal of claim 39, wherein the constant envelope composite signal includes Orthogonal Frequency Division Multiplexing (OFDM) component signals.

44. The method for forming the composite signal of claim 39, wherein the constant envelope composite signal includes Code Division Multiple Access (CDMA) component signals.

45. The method for generating the composite signal of claim 39, wherein the component signals are pseudorandom noise (PRN) spreading codes.

46. The method for generating the composite signal of claim 45, wherein the PRN spreading codes are at a plurality of different carrier frequencies.

47. The method for generating the composite signal of claim 39, wherein each of the component signals is at a plurality of carrier frequencies.

48. The method for forming the composite signal of claim 39, wherein the composite signal includes Frequency Division Multiple Access (FDMA) signals.

49. The method for forming the composite signal of claim 39, further including the step of:
performing additional optimization processes for different carrier frequencies.

50. The method for forming the composite signal of claim 49, wherein a number of additional optimizations performed corresponds to a number of phase steps associated with the different carrier frequencies.

51. The method for forming the composite signal of claim 50, wherein the number of phase steps associated with the different carrier frequencies is determined by quantizing the continuous phase rotation of the RF carrier to ensure a negligible correlation loss.

52. A method for forming a constant envelope composite signal from a plurality of N component signals, comprising the steps of:
enumerating $M^N$ phase states for combining the N component signals, each having M possible signal phases, where N is a positive integer $\geq 3$ and M is a positive integer $\geq 2$;
formulating N intra-signal constraint equations, each as a function of the $M^N$ phase states, to provide intra-signal constraints on the component signals;
formulating K inter-signal constraint equations, where $0 \leq K \leq N(N-1)/2$, each as a function of the $M^N$ phase states, to provide inter-signal constraints between the component signals;
performing an optimization process to minimize the constant envelope composite signal, subject to the intra-signal constraints on the component signals and the inter-signal constraints between the component signals;
modulating a Radio Frequency (RF) carrier using the phase states determined through the optimization process to produce the constant envelope composite signal from the N component signals; and
performing additional said optimization processes for different carrier frequencies, wherein a number of additional said optimizations performed corresponds to a number of phase steps associated with the different carrier frequencies, and wherein the number of phase steps associated with the different carrier frequencies is determined by quantizing the continuous phase rotation of the RF carrier to ensure a negligible correlation loss.

53. An apparatus for generating a constant envelope composite signal from a plurality of component signals, comprising:

a synthesizer configured to generated a carrier signal; and electronics configured to modulate the carrier signal utilizing a finite set of composite signal phases to combine three or more component signals, each having two or more possible phases to generate and maintain the constant envelope composite signal, the finite set of composite signal phases being determined through an optimization process that minimizes an objective function comprising the constant envelope of the composite signal, subject to a plurality of intra-signal constraints for the component signals, wherein the electronics include a modulator configured to utilize multiple finite sets of optimized phase tables, determined through additional said optimization processes to accommodate different carrier frequencies, wherein a number of additional said optimizations performed corresponds to a number of phase steps associated with the component signals at a plurality of different carrier frequencies, and wherein the number of phase steps associated with the different carrier frequencies is determined by quantizing the continuous phase rotation of the carrier to ensure a negligible correlation loss.

54. An apparatus for generating a constant envelope composite signal from a plurality of component signals, comprising:

a synthesizer configured to generated a carrier signal; and electronics configured to modulate the carrier signal utilizing a finite set of composite signal phases to combine three or more component signals, each having two or more possible phases to generate and maintain the constant envelope composite signal, the finite set of composite signal phases being determined through an optimization process that minimizes an objective function comprising the constant envelope of the composite signal, subject to a plurality of constraints on desired signal power levels for the component signals, wherein the electronics include a modulator configured to utilize multiple finite sets of optimized phase tables, determined through additional said optimization processes, to accommodate different carrier frequencies, wherein a number of additional said optimizations performed corresponds to a number of phase steps associated with the component signals at a plurality of different carrier frequencies, and wherein the number of phase steps associated with the different carrier frequencies is determined by quantizing the continuous phase rotation of the carrier to ensure a negligible correlation loss.

* * * * *